United States Patent [19]

Jones et al.

[11] Patent Number: 5,428,984
[45] Date of Patent: Jul. 4, 1995

[54] SELF TEST APPARATUS FOR ULTRASONIC SENSOR

[75] Inventors: Lawrence Jones, West Dundee; Boris Rosselson; Alex Esin, both of Des Plaines, all of Ill.

[73] Assignee: Kay-Ray/Sensall, Inc., Mount Prospect, Ill.

[21] Appl. No.: 113,973

[22] Filed: Aug. 30, 1993

[51] Int. Cl.6 .................. G01F 23/28; G01F 25/00
[52] U.S. Cl. .................. 73/1 H; 73/1 DV; 73/290 V
[58] Field of Search .......... 73/1 L, 1 DV, 290 V, 73/599, 600, 602, 614, 590, 605, 861.28, 861.29, 861.31, 32 A, 54.41, 61.42, 61.45, 61.75, 61.79; 340/653; 367/93

[56] References Cited

U.S. PATENT DOCUMENTS

| | | | |
|---|---|---|---|
| 3,269,172 | 8/1966 | McGaughey | 73/614 X |
| 4,131,872 | 12/1978 | Inoue et al. | 367/93 |
| 4,240,281 | 12/1980 | Lather et al. | 73/1 DV |
| 4,299,114 | 11/1981 | Silvermetz et al. | 73/1 H |
| 4,316,183 | 2/1982 | Palmer et al. | 340/621 |
| 4,375,679 | 3/1983 | Park, Jr. et al. | 73/1 DV X |
| 4,384,491 | 5/1983 | Brown et al. | 73/861.28 |
| 4,394,824 | 7/1983 | Kanda et al. | 73/606 |
| 4,446,735 | 5/1984 | Weilacher et al. | 73/597 |
| 4,448,207 | 5/1984 | Parrish | 128/771 |
| 4,452,656 | 6/1984 | Johnson | 73/861.28 |
| 4,459,689 | 7/1984 | Biber | 367/107 |
| 4,470,299 | 9/1984 | Soltz | 73/290 V |
| 4,480,474 | 11/1984 | Kazama et al. | 73/600 |
| 4,482,889 | 11/1984 | Tsuda et al. | 340/514 |
| 4,578,997 | 4/1986 | Soltz | 73/290 V |
| 4,630,245 | 12/1986 | Dam | 367/93 |
| 4,655,084 | 4/1987 | Renzel | 73/600 X |
| 4,676,098 | 6/1987 | Erlenkämper et al. | 73/290 V |
| 4,704,905 | 11/1987 | Arora | 73/596 |
| 4,708,022 | 11/1987 | Johnson | 73/861.28 |
| 4,708,191 | 11/1987 | Block et al. | 164/150 |
| 4,715,226 | 12/1987 | Dorr | 73/290 V |
| 4,722,224 | 2/1988 | Scheller et al. | 73/600 X |
| 4,735,097 | 4/1988 | Lynnworth | 73/861.28 |
| 4,765,186 | 8/1988 | Dieulesaint et al. | 73/290 V |
| 4,770,038 | 9/1988 | Zuckerwar et al. | 73/290 V |
| 4,785,664 | 11/1988 | Reebs | 73/290 V |
| 4,787,240 | 11/1988 | McShane | 73/290 V |
| 4,787,407 | 11/1988 | Vogel | 137/2 |
| 4,815,323 | 3/1989 | Ellinger et al. | 73/290 V |
| 4,821,569 | 4/1989 | Soltz | 73/290 V |
| 4,833,918 | 5/1989 | Jean et al. | 73/290 V |
| 4,868,797 | 9/1989 | Soltz | 367/98 |
| 4,896,535 | 1/1990 | Duckart et al. | 73/290 V |
| 4,909,080 | 3/1990 | Kikuta et al. | 73/290 V |
| 4,920,796 | 5/1990 | Duckart et al. | 73/290 V |
| 4,954,997 | 9/1990 | Dieulesaint et al. | 367/13 |
| 4,984,449 | 1/1991 | Caldwell et al. | 73/49.2 |
| 5,121,340 | 6/1992 | Campbell et al. | 73/1 H X |
| 5,126,945 | 6/1992 | Ko | 364/469 |
| 5,131,278 | 7/1992 | Baumoel | 73/861.28 |
| 5,155,472 | 10/1992 | Dam | 367/93 X |
| 5,251,469 | 10/1993 | Chan | 73/1 DV |
| 5,269,188 | 12/1993 | Esin et al. | 73/1 DV X |

FOREIGN PATENT DOCUMENTS

| | | | |
|---|---|---|---|
| 0409458A1 | 1/1991 | European Pat. Off. | G01F 23/28 |
| WO82/04122 | 11/1982 | WIPO | G01F 23/28 |
| WO92/18835 | 10/1992 | WIPO | G01F 23/28 |
| PCTUS/92/-05892 | 2/1993 | WIPO . | |

OTHER PUBLICATIONS

"Acoustic Emission—A Diagnostic Tool in Non-destructive Testing" *Ultrasonic Testing*, by J. Szilard, published by John Wiley & Sons, pp. 463 467, 488.

*Primary Examiner*—Thomas P. Noland
*Attorney, Agent, or Firm*—Westman, Champlin & Kelly

[57] ABSTRACT

An ultrasonic liquid level sensor includes an ultrasonic coupling element for use in self testing. The sensor includes a gap and a pair of transducers spaced apart by the gap. The sensor senses presence of liquid in the gap. The ultrasonic coupling element extends between the transducers and acoustically couples them together. The coupling element is used to test ultrasonic sensor integrity.

16 Claims, 2 Drawing Sheets

SELF TEST APPARATUS FOR ULTRASONIC SENSOR

BACKGROUND OF THE INVENTION

The present invention relates to ultrasonic sensors for measuring the physical properties of materials within a space, and more particularly relates to a self test of such a sensor.

Known ultrasonic liquid level sensors installed in tanks include a sensor housing arranged around a gap or notch on the outside of the housing. When liquid level rises in the tank, the liquid flows into the gap and it is sensed by transmitting ultrasonic energy through the liquid in the gap. A pair of ultrasonic transducers or crystals in the housing transfer acoustic energy through the liquid in the gap via a resin transmission layer that bonds the crystals to the inside of the housing and provides acoustic impedance matching for increased transmission efficiency. Under harsh service conditions, the crystals can fail or the bonding of the transmission layer can fail and there is a need to test for such failures.

In addition to the transmission path through the fluid in the gap there is also a second transmission path between the crystals via the housing itself. In the past, sensing transmission along this second path around the gap through the metal housing has been a satisfactory means of testing the operation of the sensor when there is no liquid in the gap to provide transmission. Such a self test is described in U.S. Pat. No. 4,299,114 to Silvermetz et al.

With the use of non-metallic material for housings, such as polymers, resins, and the like (commonly called "plastics"), however, there are problems with using the housing itself as a test transmission path. These non-metallic materials change their sound transmission properties as a function of temperature. The variations can be large, and are quite unpredictable from one batch of plastic to the next, making it difficult to develop reliable electronic compensation for the variations.

The test signal transmitted through such plastic materials is unpredictable at temperature extremes giving a false indication that the sensor is defective. There is thus a need to provide a reliable test arrangement in ultrasonic sensors that does not rely on transmission of a test signal around the gap through the plastic housing.

SUMMARY OF THE INVENTION

The present invention is a self test apparatus for an ultrasonic liquid level sensor. The sensor includes a housing which forms a gap. Ultrasonic coupling material is placed inside the housing adjacent the gap and carries first and second transducers. The transducers transfer ultrasonic energy through a first path across the gap and through a second path in the housing. The second path includes a metal element that provides ultrasonic coupling between the first and second transducers. The second path is used as a self test of operation of the transducer.

DETAILED DESCRIPTION OF THE PREFERRED EMBODIMENTS

Figure 1:
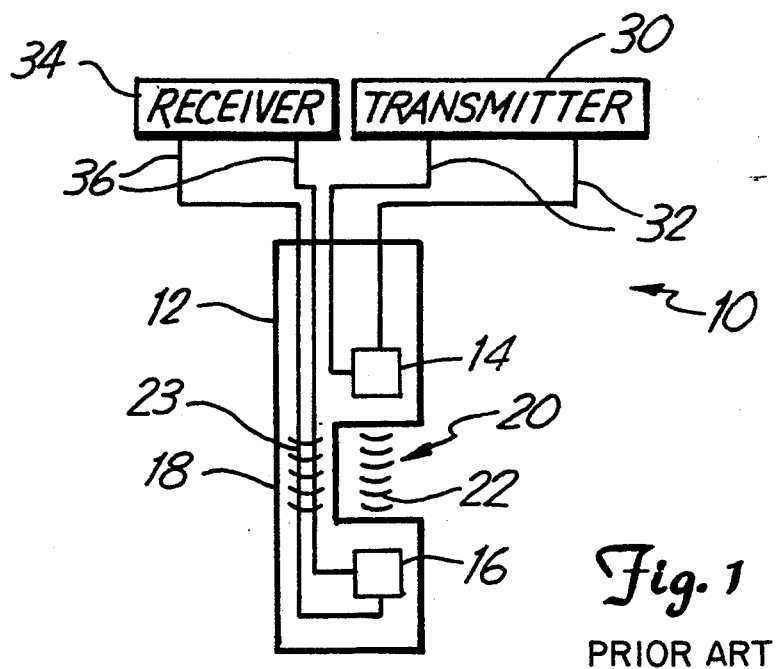
FIG. 1 is a sectional view of a prior art ultrasonic liquid level sensor.

FIG. 1 is a sectional view of a prior art ultrasonic level sensor 10. Sensor 10 includes support structure 12, ultrasonic transmit transducer (crystal) 14 and ultrasonic receive transducer (crystal) 16. Support structure 12 includes stem (bridge) 18 and gap 20. Transducers 14 and 16 are mounted to support structure 12 such that they transmit and receive ultrasonic signals 22 across gap 20 and ultrasonic signals 23 along stem 18. The interfaces between sensor 14 and gap 20 and sensor 16 and gap 20 are called sensor body windows.

Transmit transducer 14 is connected to transmitter 30 through electrical leads 32. Transmitter 30 periodically supplies electronic transmit pulses to transducer 14. When transmitter 30 delivers a transmit pulse to transducer 14, the pulse energizes transducer 14 causing it to resonate at its natural frequency. Transducer 14 emanates ultrasonic signals 22 and 23 which travel through gap 20 and stem 18, respectively. Ultrasonic signals traveling through gap 20 are the main waveform used to sense a liquid and signals traveling through stem 18 are the self test waveform. Receive transducer 16 converts ultrasonic signals 22 and 23 into electrical signals which are supplied to receiver 34 through electrical leads 36.

When gap 20 is void of liquid, the attenuation of main waveform is significantly greater than when liquid is present. Absorption is particularly great at high frequencies such as above several kH. When gap 20 is empty, the signal which travels through the gap is substantially null. When gap 20 is filled with liquid, the main waveform is received by transducer 16. The main waveform causes transducer 16 to resonate and generate electrical signals. Therefore, presence or absence of the main waveform at receive transducer 16 is representative of the presence or absence of a liquid within gap 20.

The condition of ultrasonic sensor 10 can be monitored by examining ultrasonic signal 23 which passes through stem 18. If transducer 16 and 18 are functioning and properly coupled to support structure 12, self test signal 23 should have certain predetermined characteristics (such as a signal strength above a predetermined minimum). If stem 18 is constructed of metal, the predetermined characteristics are relatively constant. However, if a non-metallic material is used to construct structure 12, such as polymers, resins, etc. (i.e. "plastics"), the acoustic properties of the structure are subject to large variations based upon external influences such as temperature. These variations are not only large, but are quite unpredictable from one batch of material to another making it difficult to reliably compensate for the variations.

The present invention provides an ultrasonic self test signal wave guide extending through the bridge of a sensor housing and acoustically coupling the transmit transducer with the receive transducer.

Figure 2:
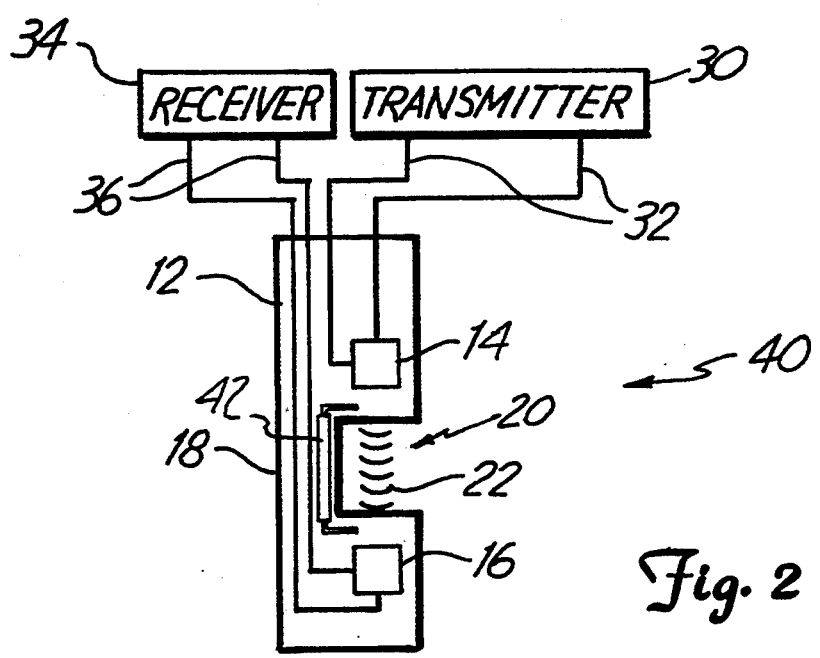
FIG. 2 is a sectional view of an ultrasonic liquid level sensor in accordance with the present invention.

FIG. 2 is a sectional view of an ultrasonic sensor 40 in accordance with the present invention. Many of the elements of sensor 40 are the same as those of sensor 10 and the numbering of FIG. 2 reflects this similarity. However, support structure 12 can be non-metallic without degrading the self test operation of the sensor. Sensor 40 includes ultrasonic coupling element 42 extending between transducer 14 and the transducer 16 through bridge 18. Ultrasonic coupling element 42 acts as a waveguide and carries ultrasonic signals between transducers 14 and 16 and the two sensor body windows. In a preferred embodiment, ultrasonic coupling element 42 is made of a material with ultrasonic signal transmission characteristics which are fairly stable within the application's temperature range relative to external influences, such as temperature. Metal is such a coupling element. In situations where support structure 12 is a non-metallic material such as a polymer, resin and the like (i.e. plastic), ultrasonic coupling element 42 provides reliable and stable ultrasonic coupling between transducer 14 and transducer 16 for use during self test.

Figure 3:
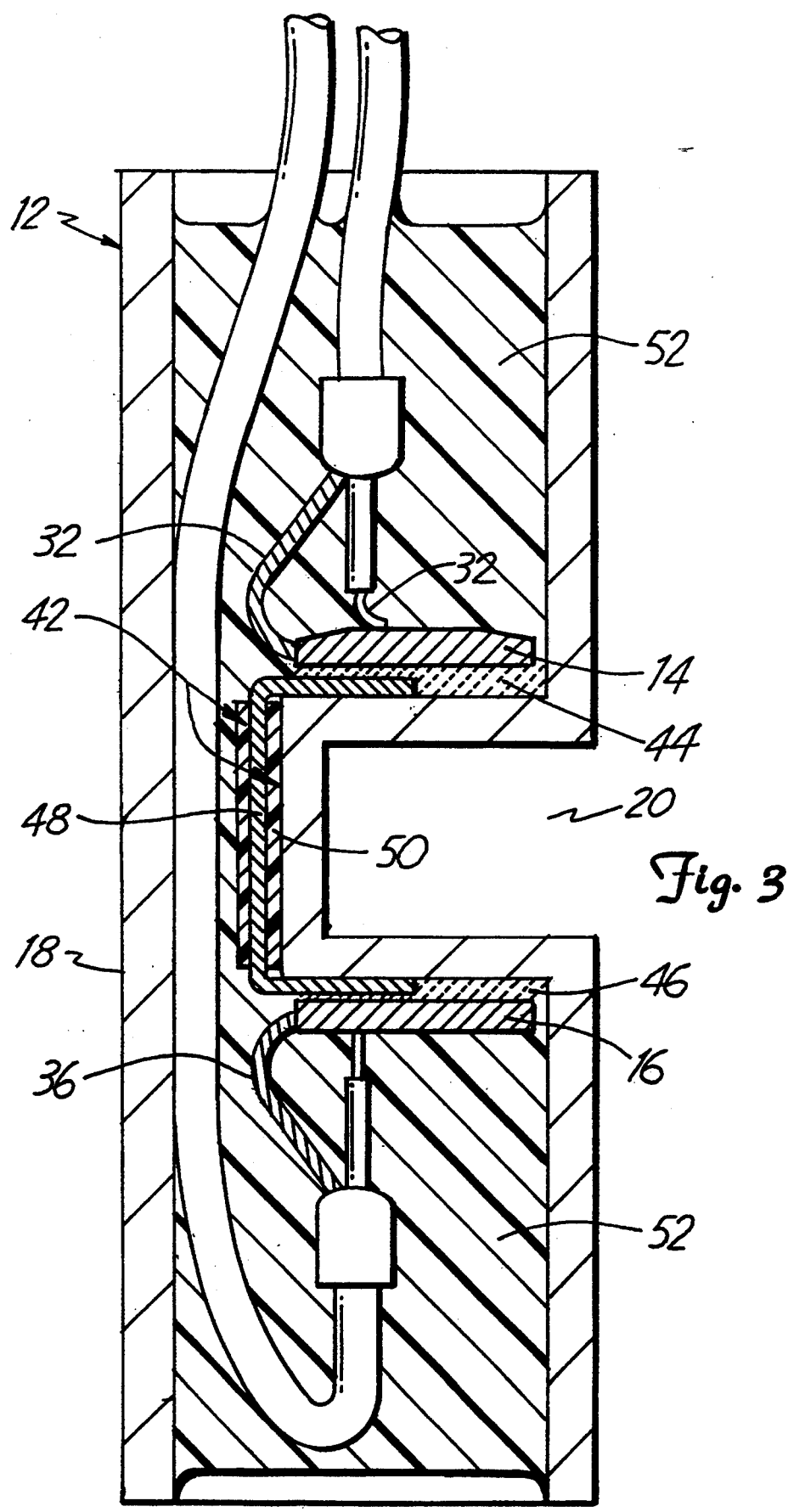
FIG. 3 is a detailed cross sectional view of support structure for an ultrasonic liquid level sensor in accordance with the present invention.

FIG. 3 shows a detailed cross sectional view of support structure 12 of ultrasonic transducer 40. Leads 32 and 36 are shielded, typically coaxially cable. Transducers 14 and 16 are coupled to gap 20 with acoustic matching layers 44 and 46, respectively. Typically, layers 44 and 46 comprise epoxy.

Ultrasonic coupling element 42 in accordance with the present invention provides acoustic coupling between transducer 14 and 16. Element 42 carries an ultrasonic signal between transducer 14 and 16 with low attenuation. Element 42 includes metal element 48 and acoustic isolation spacer 50. In a preferred embodiment, metal element 48 is a wire made of, for example, copper and spacer 50 is Teflon ® tubing which surrounds element 48. Metal element 48 extends into acoustic matching layers 44 and 46 and has a first end positioned between transducer 14 and gap 20 and a second end positioned between transducer 16 and gap 20. Support structure 12 is filled with an insulating material 52 such as epoxy or silicon syntactic foam. Acoustic isolation spacer 50 separates a midportion of element 48 from insulating material 52 which can absorb the self test signal. In one embodiment, acoustic isolation spacer 50 comprises poly-tetra-fluoro-ethylene polymer.

In operation, ultrasonic coupling element 42 provides ultrasonic coupling between transducers 14 and 16. Coupling element 42 carries ultrasonic signals between transducers 14 and 16.

The invention provides reliable transmission of self test waveforms between the transducers of an ultrasonic liquid level sensor. The ultrasonic coupling element provides stable ultrasonic coupling between the transducers so that self testing is not degraded by external influences such as temperature. This allows the support structure of the sensor to be of material with unpredictable sonic characteristics, such as a plastic.

Although the present invention has been described with reference to preferred embodiments, workers skilled in the art will recognize that changes may be made in form and detail without departing from the spirit and scope of the invention.

What is claimed is:

1. An ultrasonic liquid level sensor, comprising:
a housing arranged around a gap outside the housing into which the liquid can flow for sensing;
first and second layers of ultrasonic coupling materials spaced apart inside the housing adjacent the gap;
first and second transducers contacting the first and second layers respectively and transferring acoustic energy along a first path through the gap for sensing the liquid and along a second path inside the housing for testing transducer function;
wherein the second path includes:
a metal element inside the housing coupling acoustic energy from a first end thereof in the first layer via the element's midsection to a second end thereof in the second layer; and
an acoustically isolating spacer separating the midsection from contact with the housing and insulating material.

2. The ultrasonic liquid sensor of claim 1, wherein the housing is formed of a non-metallic material.

3. The ultrasonic liquid sensor of claim 2, wherein the non-metallic material is a resin.

4. The ultrasonic liquid sensor of claim 3 wherein the resin is PTFE.

5. The ultrasonic liquid sensor of claim 1, wherein the acoustically isolating spacer is formed of poly-tetra-fluoro-ethylene polymer.

6. The ultrasonic liquid sensor of claim 1, wherein the metal element is formed of copper.

7. The ultrasonic liquid sensor of claim 1, including:
means for energizing the first transducer; and
means for monitoring ultrasonic signals received by the second transducer generated by the first transducer.

8. The ultrasonic liquid sensor of claim 7 including self test means for testing the ultrasonic liquid sensor integrity based upon ultrasonic signals transmitted from the first transducer to the second transducer through the metal element.

9. The ultrasonic liquid sensor of claim 1 wherein the first end of metal element is positioned between the first transducer and a sensor body window adjacent the gap and the second end of the metal element is positioned between the second transducer and a sensor body window adjacent the gap.

10. An ultrasonic liquid level sensor comprising:
a housing arranged around a gap into which liquid can flow for sensing;
a first ultrasonic transducer carried in the housing adjacent the gap;
a second ultrasonic transducer carried in the housing adjacent the gap, the first and second ultrasonic transducers for transferring energy along a first path passing through the gap to sense liquid and for transferring energy along a second path inside the housing to test the transducers;
an ultrasonic coupling element inside the housing extending between the first transducer and the second transducer forming the second path; and
first and second layers of ultrasonic coupling material between the gap and the first and second transducers, respectively, wherein the ultrasonic coupling element is acoustically coupled to the first and second layers.

11. The ultrasonic liquid sensor of claim 10 wherein the ultrasonic coupling element comprises:
a metal element coupling acoustic energy from the first transducer via a midsection of the element to the second transducer; and
an acoustically isolating spacer separating the midsection from contact with insulating material.

12. The ultrasonic liquid sensor of claim 11 wherein the acoustically isolating spacer is formed of PTFE.

13. The ultrasonic liquid sensor of claim 11 wherein the metal element is formed of copper.

14. The ultrasonic liquid sensor of claim 10 wherein the housing is formed of a non-metallic material.

15. The ultrasonic liquid sensor of claim 10 including:
means for energizing the first transducer; and means for monitoring ultrasonic signals received by the second transducer generated by the first transducer.

16. The ultrasonic liquid sensor of claim 16 including self test means for testing ultrasonic sensor integrity based upon ultrasonic signals transmitted from the first transducer to the second element through the ultrasonic coupling element.

* * * * *